April 7, 1970     S. M. DE CORSO ET AL     3,504,411

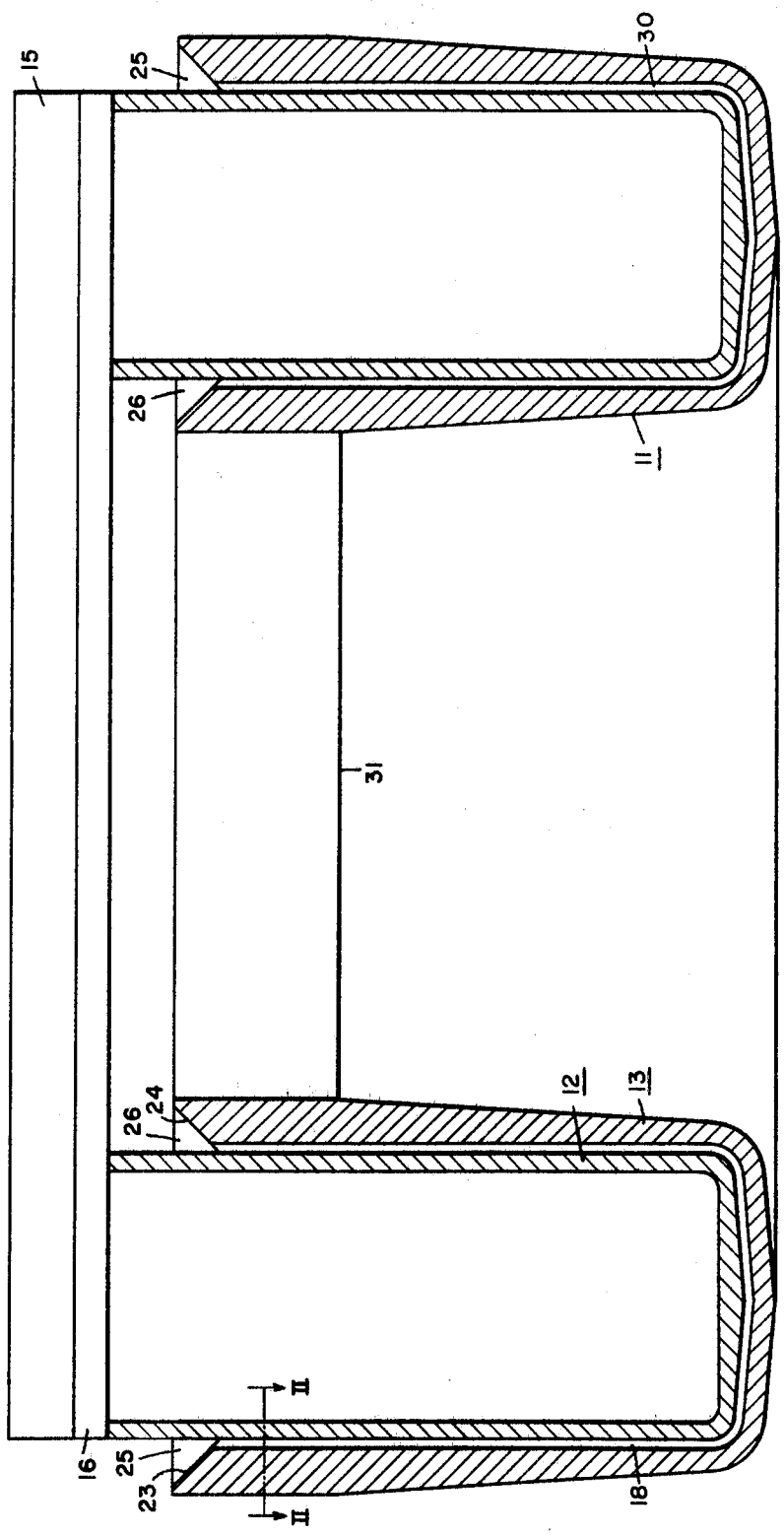

PROCESS FOR PRODUCING AN ELECTRODE TIP

Filed Oct. 11, 1967     3 Sheets-Sheet 3

United States Patent Office 3,504,411
Patented Apr. 7, 1970

---

3,504,411
PROCESS FOR PRODUCING AN ELECTRODE TIP
Serafino M. De Corso, Media, and Robert W. Corcoran, East McKeesport, Pa., assignors to Westinghouse Electric Corporation, Pittsburgh, Pa., a corporation of Pennsylvania
Filed Oct. 11, 1967, Ser. No. 674,484
Int. Cl. H01j 9/00
U.S. Cl. 29—25.14                     27 Claims

ABSTRACT OF THE DISCLOSURE

Two annular shells each substantially U-shaped in cross-section and preferably composed of a material having high electrical and thermal conductivity are formed, the dimensions of the axially extending wall portion of smaller diameter and the axially extending wall portion of larger diameter of one shell being such that said one shell can be inserted in the annular space of the other shell with the outside surfaces of the wall portions of the inner shell making close fitting engagement with the inner adjacent wall surfaces of the outer shell. Generally U-shaped grooves are formed in the inner surface of the outer shell or the outer surface of the inner shell, thereby forming lands between the grooves, the grooves serving as fluid flow passageways for cooling the arcing surface of the tip. According to one process, the surfaces of the lands are knurled, the inner shell is then inserted in the outer shell to form a shell assembly and molten brazing compound added in sufficient quantity to completely fill both the fluid flow passageways formed by the aforementioned grooves and the gaps formed by knurling. While the assembly is heated well above the melting point of the brazing alloy the assembly is inverted. The excess braze drains out of the water passages completely opening the same, while remaining in the knurled gaps due to capillary action. According to another process after the grooves are coined either the outer surfaces of the inner shell or the inner surfaces of the outer shell are precoated with braze material, and the assembly then heated to effent brazing. According to still a further process, after large grooves are coined in one shell surface, a smaller groove is coined in the surface of each of the lands formed betwen the larger grooves and braze material placed therein, if desired in the form of a wire, after which the assembly is heated to reduce the braze material to a molten state and effect the brazing operation.

CROSS-REFERENCE TO RELATED APPLICATIONS

This application is related to copending application Ser. No. 656,196, filed July 26, 1967, by S. M. DeCorso et al., for Improved Process for Producing an Electrode Tip and assigned to the assignee of the instant invention.

BACKGROUND OF THE INVENTION

Field of the invention

The invention relates to a process for constructing an electrode tip having fluid flow passageways for the flow of cooling fluid near the arcing surface and an annular space therein for the insertion of a magnetic field coil which when energized substantially continuously rotates the arc around the arcing surface.

Description of the prior art

One prior art process for producing a tip includes the steps of forming inner and outer shells, placing a plurality of radially extending tubes in the outer shell, thereafter inserting the inner shell in the annular space formed between the axially extending portions of the tubes and thereafter brazing the two shells and the tubes to form an integral tip structure. The prior art process may employ spacers between the tubes.

SUMMARY OF THE INVENTION

Our invention eliminates the need for tubes and instead utilizes generally U-shaper grooves coined in either the inner surface of the outer shell or the outer surface of the inner shell, forming lands between the grooves. The lands may be knurled to form room for a brazing compound; the brazing compound may be preapplied to either the outer shell or the inner shell before the shells are assembled; additional small generally U-shaped grooves may be formed in the lands, the additional small grooves having brazing material inserted therein, after which the shells are assembled and the brazing process carried out.

BRIEF DESCRIPTION OF THE DRAWINGS

FIGURE 1 is a view of a tip illustrating our invention according to several processes thereof;

BRIEF DESCRIPTION OF THE PREFERRED EMBODIMENTS

Figure 2A:
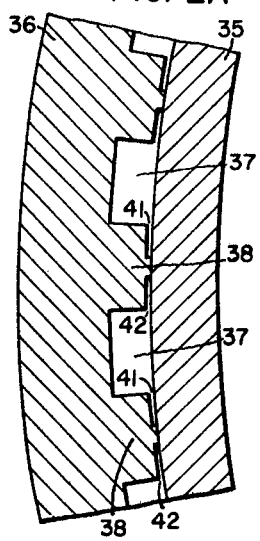
FIGS. 2A, 2B, 2C and 2D illustrate respectively our process employing knurled lands, our process employing an inner shell precoated with brazing material, our process employing land surfaces precoated with brazing material, and our process employing small grooves coined into each land and containing brazing material.

In FIGURE 1 the electrode tip is generally designated 11 and the inner and outer shells are generally designated 12 and 13. As will be understood during the brazing process it is desirable that the inner shell be held in firm engagement with the outer shell, and FIG. 1 illustrates one means of accomplishing this by covering the inner shell with a weight 15 separated from the inner shell by, for example, disc 16 composed of asbestos or other suitable material. FIGURE 1 may be thought of with reference to FIG. 2B which illustrates the process of the invention in which grooves 18 are coined in the outer shell 13 with lands 19 between adjacent grooves, the grooves being U-shaped and extending around the entire inside wall portion of the outer shell, one of the grooves being shown at 18 in FIGURE 1, the grooves being peripherally spaced around the entire outer shell on both the wall portion of larger diameter and the wall portion of smaller diameter and on the inside surface of the bottom. As before described, according to one process of the invention, the outside surfaces of both the wall of smaller diameter and the wall of larger diameter as well as the bottom of the inner shell are coated with a brazing material, and the inner shell thereafter forced into the annular space of the outer shell and thereafter the shell assembly is heated to a temperature which causes the braze material to become molten but to a temperature less than the melting temperature of the material of which the inner and outer shells are composed. FIG. 1 may be thought of as a cross-section through the tip after the brazing process is completed so that for all practical purposes the brazing material 21 of FIG. 2 is not visible in FIG. 1.

Figure 7:
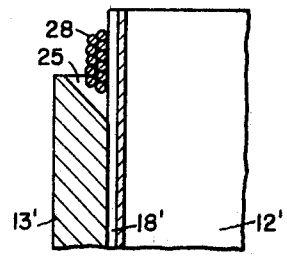
FIG. 7 is a fragmentary view illustrating our processes in which braze material is applied to the shell assembly and the shell assembly and the braze material thereafter heated together, the braze material while molten flowing into the desired spaces.

In FIG. 1 the outer shell 13 is seen as having sloping upper surfaces 23 and 24 providing troughs 25 and 26 respectively. These sloping surfaces are needed only when a tip is to be constructed according to some of our processes and are not needed in other of our processes, in which case they can be dispensed with. According to one method of practicing our invention illustrated in FIG. 7, brazing material 28 may be wound around the top of the inner shell, the two shells then assembled and put in a furnace where the brazing material melts, runs into the troughs including trough 25 and thence runs into the grooves and spaces within the shell assembly, which it is desired to fill with brazing material. FIG. 7 would be illustrative of a shell assembly constructed according to FIG. 6B hereinafter to be described in which the grooves are cut in the inner shell and the cross-section of FIG. 7 would be taken through the relatively thin portion of the shell in which a groove is cut, the space between the land and the adjacent surface of the outer shell not being shown for simplicity of illustration.

Referring again to FIG. 1, it is seen that on the other side of the shell assembly an additional groove 30 is shown extending generally around the entire inner surface of the outer shell and being generally U-shaped in accordance with the generally U-shaped cross-section of the outer shell.

An additional supporting member 31 may be provided to assist in holding the inner and outer shells firmly in place during the brazing process.

Figure 8:
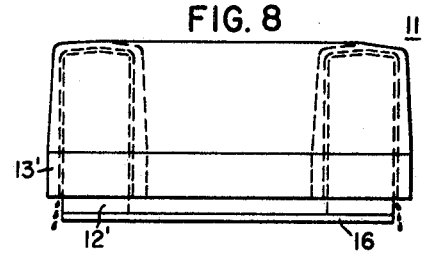
FIG. 8 illustrates the draining of excess braze material from a tip assembly according to some of the processes of our invention.

Generally speaking and by way of summary, the tip of FIG. 1 may be constructed in two ways. The inner and outer shells may be assembled and if desired heated to a predetermined temperature less than the melting temperature of the material. The brazing material may be separately heated until it attains a molten condition and thereafter poured into the spaces of the shell assembly. As an alternative method of constructing the tip of FIG. 1, the inner and outer shells may be assembled, the brazing material may be added to the assembly, the shell assembly and the brazing material may be heated together to a temperature less than the melting temperature of the material but a temperature at which the brazing material becomes molten and runs into the aforementioned spaces. The assembly is thereafter allowed to cool and the braze material hardens and forms in effect a unitary tip structure. Before the braze material is allowed to cool, the assembly may be inverted as shown in FIG. 8 and excess braze material drained from the assembly if desired to insure that all of the fluid flow passageways including passageways 18 and 30 are perfectly clear of braze material.

Particular reference is now made to FIG. 2A illustrating another process according to our invention for constructing the tip. Inner and outer shells 35 and 36 are formed; U-shaped grooves 37 are formed in the outer shell with lands 38 between adjacent grooves. The faces, or surfaces of the lands which are to be adjacent the other shell, are knurled to form spaces or gaps 41 and 42 adjacent the surface of the land which faces the other shell, and the shells are thereafter assembled as shown in FIG. 2A, sufficient molten brazing compound is added to fill up all of the grooves 37 as well as all of the spaces or gaps 41 and 42. Before the brazing material is allowed to harden, the assembly is inverted as shown in FIG. 8 while maintaining the inner shell in place; the brazing material flows from the grooves leaving completely free U-shaped passageways for the flow of cooling fluid. However, because of capillary action, brazing material remains in the gaps 41 and 42. This last-named brazing material is allowed to cool and harden forming an integral structure of the two shells.

It will be understood that before adding molten brazing material, the two shells 35 and 36 may be brought to a predetermined temperature less than the melting temperature of the material, to assist in the brazing process.

Figure 6A:
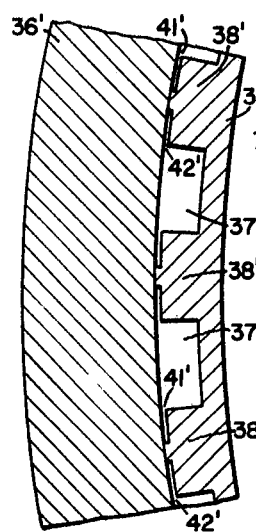
FIGS. 6A, 6B, 6C and 6D illustrate our process in which shells complementary to those illustrated in FIGS. 2A, 2B, 2C and 2D respectively are shown, which may be knurled as to their lands, have brazing material preapplied thereto, or have additional small grooves cut in the surfaces of the lands to receive brazing material.

Particular reference is made now to FIG. 6A which is similar to FIG. 2A except that the grooves 37' have been cut in the inner shell 35' with lands 38' and spaces or gaps 41' and 42'. A process similar to that before described is employed, the molten brazing material remaining in the spaces 41' and 42' when the shell assembly is inverted, this brazing material thereafter being allowed to cool and harden.

Figure 2B:
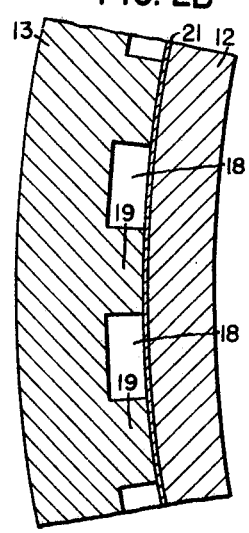

Particular reference is made now to FIG. 2B. In FIG. 2B the aforementioned grooves 18 are cut in the outer shell 13, a layer of braze material 21 is applied to the outside surface of the walls and bottom of the inner shell, the shells are thereafter assembled, the assembly is heated to a temperature which melts or further melts the brazing material 21, but does not melt the material of which the shells are composed. The portions of the brazing material adjacent the grooves 18 melts and runs of the grooves when the assembly is inverted as in FIG. 8, while the portion of the brazing material between the lands and the adjacent shell is maintained in place by capillary action and is later cooled and hardened to form a unitary structure.

Figure 6B:
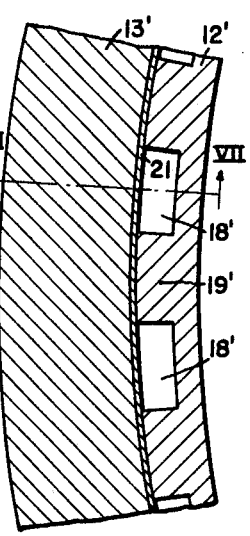

Particular reference is made to FIG. 6B which is similar to FIG. 2B except that the grooves 18' are formed in inner shell 12', and the lands 19' are in the inner shell.

Figure 2C:
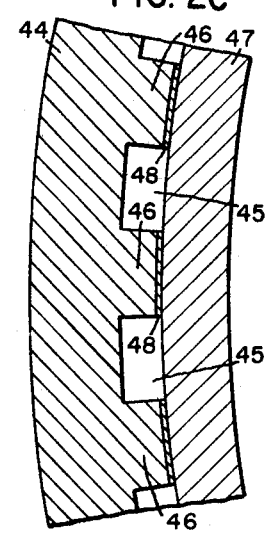

Particular reference is made now to FIG. 2C illustrating another process according to our invention for constructing the tip. In FIG. 2C the outer shell 44 has grooves 45 cut therein, and it is seen that the lands 46 do not touch the adjacent surface of inner shell 47, but that spaces are provided between the surfaces of the lands and the adjacent surface of the inner shell. This may be accomplished by originally forming the outer shell so that it does not snugly fit the inner shell, or the outer shell can be formed to snugly fit the inner shell and the faces of the lands thereafter machined off to provide the necessary spaces. In preparing the tip the brazing material 48 is applied to the surface of the lands before the shells are assembled. The brazing material for this application may have a relatively low viscosity and be melted only enough for application to the land surfaces. Thereafter the shells are forced into place, the shell assembly with the brazing material further heated so that the brazing material becomes molten and after cooling forms a bond with the material of the shells. If desired, the assembly may be inverted as in FIG. 8 before the braze material is allowed to cool to drain off any excess braze material which has gone into the grooves which are to form the fluid flow passageways. Capillary action maintains the brazing material in the very narrow space or gap between the land and the adjacent shell.

Figure 6C:
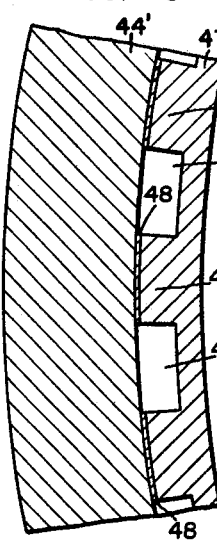

Particular reference is made now to FIG. 6C which is the complement of FIG. 2C in which grooves 45' are cut in inner shell 47' with lands 46'. As before, the brazing material 48 is applied before the shells are assembled, and is thereafter heated or further heated, the assembly inverted to drain off excess brazing material if any, brazing material remaining in the narrow spaces or gaps because of capillary action, the brazing material being allowed to cool and harden and form a unitary tip structure.

Figure 2D:
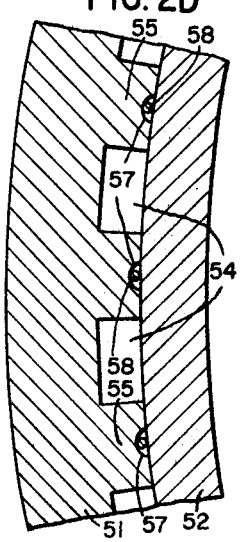

Particular reference is now made to FIG. 2D illustrating another process of our invention for constructing the tip. In FIG. 2D the outer shell is shown at 51 and the inner shell at 52. The outer shell 51 has grooves 54 formed therein with lands 55, the main surface area of the lands closely fitting the outside wall of the inner shell. The lands 55 have small grooves 57 therein in which is disposed brazing material 58 which may be in the form of wire extending around the tip. The two assembled shells with the brazing material inserted in the small grooves are heated to a temperature less than the melting point of the material of which the shields are composed but to a temperature at which the brazing material melts, forming a bond between the two shells in the neighborhood of the small grooves, the assembly being thereafter cooled.

If desired molten braze material may be added after the two shells are assembled in sufficient quantity to fill both the large and small grooves, the assembly being thereafter inverted, the molten braze material draining from the large grooves but being retained in the small grooves 57 by capillary action.

Figure 6D:
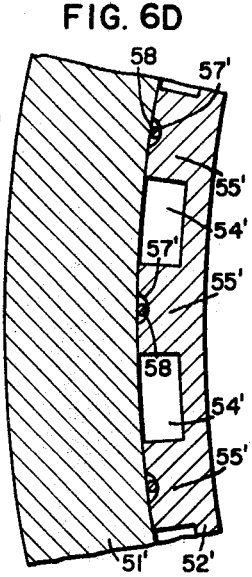

Particular reference is made now to FIG. 6D, the complement of FIG. 2D, where the grooves 54' are in the inner shell 52' having lands 55', smaller grooves 57' and brazing material 58. The tip in accordance with FIG. 6D is constructed by a method similar to that before described in connection with FIG. 2D.

Figure 5:
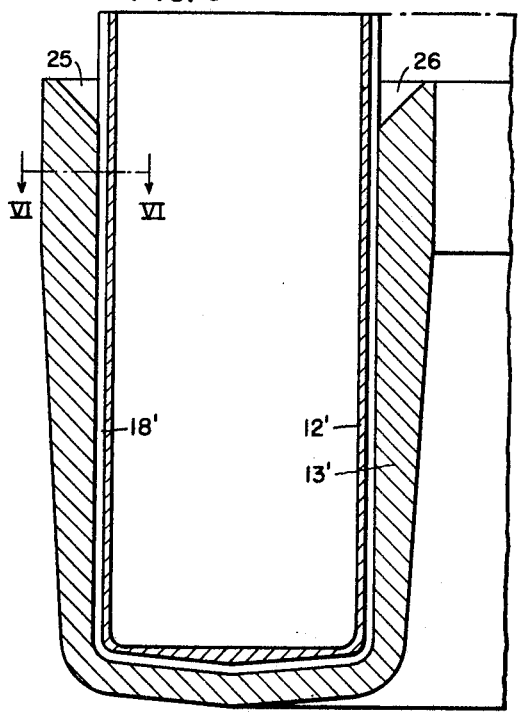
FIG. 5 further illustrates our processes.

The before described structure illustrating the processes described in connection with FIGS. 2A, 2B, 2C, 2D, 6A, 6B, 6C and 6D may be further visualized with reference to FIG. 5 and also with reference to FIG. 1 where the various cross-sections are taken, it being understood that the sectional view would vary in accordance with the configurations of the inner and outer shells.

Figure 3:
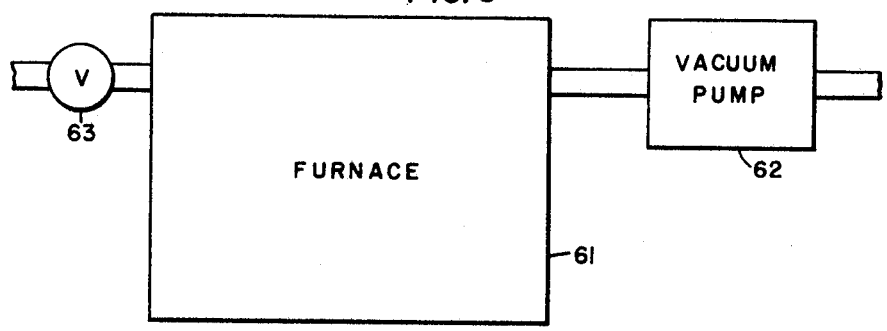
FIG. 3 is an illustration of a furnace suitable for practicing the process of our invention where the shells and the brazing compound are heated together.

In FIG. 3 a furnace generally designated 61 is shown connected to a vacuum pump 62, with a valve 63 for controlling the admission of air or other gas. It will be readily understood that where the shells and the brazing compound are heated together the shells and the brazing compound may be placed in the furnace 61 which may have suitable means, not shown for convenience of illustration, for controlling and indicating the temperature therein, where the assembly is brought to the desired temperature, and thereafter removed from the furnace whereafter excess brazing material has been drained from the assembly, the remaining brazing material is allowed to cool and harden. If desired the air from furnace 61 may be exacuated by pump 62 after closing valve 63, where it is desired to braze in a vacuum to reduce oxidation problems. Additionally it will be understood that the atmosphere in furnace 61 may be a controlled atmosphere of any desirable characteristic, for example, a reducing atmosphere which makes the use of brazing flux generally unnecessary.

Alternatively the tips of FIGS. 2B, 2C, 6B and 6C may be made by inserting the inner shell within the outer shell slightly spaced therefrom, filling all of the grooves and spaces with molten braze material, and draining the excess to clear the grooves.

It will be understood that in all of the before described processes and operations, brazing flux may be added in the passageways to be filled by the brazing material, if needed.

Figure 4:
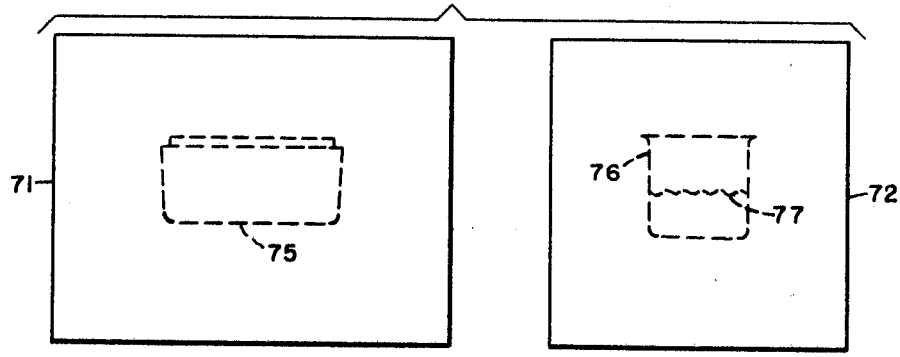
FIG. 4 illustrates furnace apparatus suitable for practicing the processes of our invention where the shells are heated separately and the brazing compound is liquefied separately.

Particular reference is made now to FIG. 4 illustrating two furnaces where the shell assembly 75 is heated in furnace 71 and the brazing compound 77 in container 76 is reduced to a molten state in furnace 72, and thereafter poured into the shell assembly.

In forming the shells, they may be pressed or forged. A number of suitable braze materials may be employed, the essential characteristic of the braze material being that it has a melting temperature substantially lower than the melting temperature of the material of which the shells are composed. The braze material should have good thermal conductivity and good electrical conductivity. A number of suitable braze materials are described in the aforementioned copending application Ser. No. 656,196. A preferred brazing alloy is a copper-silver eutectic containing 72% silver and 18% copper, because of its excellent flow properties and high thermal conductivity.

By way of further summary, according to some of the processes of our invention, sufficient alloy is provided to completely fill both the water passages and brazing gaps. The brazing material is separately heated to a molten state or alternatively the complete assembly is heated well above the melting point of the brazing alloy, and the assembly thereafter inverted. The excess braze material will drain out of the water passages, but will remain in the spaces between lands and the opposite surface of the other shell by capillary action, or will remain in additional small grooves especially provided for the braze material. According to other processes of our invention, one of the shells is precoated in whole or in part on the surface thereof adjacent the other shell with brazing material.

Any suitable means may be used for maintaining the inner shell within the outer shell in spaced position as needed for certain processes disclosed herein, for example, clamping means clamped to that portion of the inner shell which extends beyond the outer shell, FIG. 1.

The foregoing written description and drawings are illustrative and exemplary only and are not to be interpreted in a limiting sense.

We claim as our invention:

1. A process for producing an electrode tip which comprises the steps of forming two shells each substantially annular in shape and substantially U-shaped in cross-section around the entire periphery of the shell, the dimensions and contour of one of the shells being such that said last-named shell will fit into the annular space within the other shell, at least the outer shell being formed from electrically conductive material, forming U-shaped grooves in that surface of one shell which will lie adjacent the surface of the other shell, the U-shaped grooves being disposed at spaced intervals around substantially the entire periphery of said one shell and being adapted to form passageways for the flow of fluid to cool the arcing surface of the tip, forming a shell assembly by inserting the smaller of the shells within the other shell in closely fitting engagement therein, and brazing the two shells together while maintaining the passageways formed by the grooves substantially free of brazing material to form a substantially integral tip structure.

2. A process according to claim 1 in which the grooves are cut in the inner shell.

3. A process according to claim 1 in which the grooves are cut in the outer shell.

4. A process according to claim 2 in which lands are formed between the grooves in the inner shell and including the additional step of knurling the faces of the lands to form at least one thin gap over only a portion of the surface of the land between said last-named surface of the land and the adjacent surface of the other shell, the other portion of the face of the land closely fitting the adjacent surface of the other shell and maintaining the first-named surface portion of the land in spaced relation from the adjoining surface of the other shell to form said gap, and wherein the brazing step is additionally characterized as adding sufficient molten braze material to completely fill all of the grooves and all of the gaps between the land surfaces and the adjoining shell, thereafter inverting the shell assembly while maintaining the inner shell in place, the molten brazing material running out of the grooves, the molten braze material being maintained in the thin gaps between the lands and the adjoining shell by capillary action, and thereafter allowing the remaining braze material to cool and harden and form of the two shells a substantially integral tip structure.

5. A process according to claim 3 in which lands are formed between the grooves in the outer shell and including the additional step of knurling the faces of the lands to form at least one thin gap over only a portion of the surface of the land between said last-named surface of the land and the adjacent surface of the other shell, the other portion of the face of the land closely fitting the adjacent surface of the other shell and maintaining the first-named surface portion of the land in spaced relation from the adjoining surface of the other shell to form said gap, and wherein the brazing step is additionally characterized as adding sufficient molten braze material to completely fill all of the grooves and all of the gaps btween the land surfaces and the adjoining shell, thereafter inverting the shell assembly while maintaining the inner shell in place, the molten brazing material running out of the grooves, the molten braze material being maintained in the thin gaps between the lands and the adjoining shell by capillary action, and thereafter allowing the remaining braze material to cool and harden and form of the two shells a substantially integral tip structure.

6. A process according to claim 2 in which the dimensions of the inner shell including the lands are such that a small space exists between the lands and the adjacent surface of the outer shell while the inner shell is in place within the outer shell, and including the additional step of securing the inner shell in position to maintain the spaces which exist between the lands of the inner shell and the adjacent surface of the outer shell, and in which the brazing process includes adding sufficient brazing material to the grooves and to the spaces between lands and the outer shell to completely fill the grooves and spaces, thereafter inverting the shell assembly while maintaining the inner shell in position, the molten brazing fluid draining completely out of the grooves and forming free passageways through the grooves, the molten brazing material being retained in the small spaces between lands and the outer shell by capillary action, and thereafter allowing the molten brazing material to cool and harden and form of the inner and outer shells a unitary tip structure.

7. A process according to claim 3 in which the dimensions of the outer shell including the lands are such that a small space exists between the lands and the adjacent surface of the other shell while the inner shell is in place within the outer shell, and including the additional step of securing the inner shell in position to maintain the spaces which exist between the lands of the outer shell and the adjacent surface of the inner shell, and in which the brazing process includes adding sufficient brazing material to the grooves and to the spaces between lands and the inner shell to completely fill the grooves and spaces, thereafter inverting the shell assembly while maintaining the inner shell in position, the molten brazing fluid draining completely out of the grooves and forming free passageways through the grooves, the molten brazing material being retained in the small spaces between lands and the inner shell by capillary action, and thereafter allowing the molten brazing material to cool and harden and form of the inner and outer shells a unitary tip structure.

8. A process according to claim 2 in which the dimensions of the inner shell and the lands thereof are so proportioned that the inner shell will fit into the outer shell with small gaps existing between the surfaces of the lands and the adjacent wall of the outer shell, precoating the surfaces of all of the lands of the inner shell with brazing material before inserting the inner shell in the outer shell, and thereafter heating the inner and outer shells and the brazing material to a temperature sufficient to cause the brazing material to form a bond between the inner and outer shells and produce a substantially unified tip structure.

9. A process according to claim 3 in which the dimensions of the outer shell and the lands thereof are so proportioned that the inner shell will fit into the outer shell with small gaps existing between the surfaces of the lands and the adjacent wall of the inner shell, precoating the surfaces of all of the lands of the outer shell with brazing material before inserting the inner shell in the outer shell, and thereafter heating the inner and outer shells and the brazing material to a temperature sufficient to cause the brazing material to form a bond between the inner and outer shells and produce a substantially unified tip structure.

10. A process according to claim 2 in which the lands between the grooves in the inner shell have dimensions whereby the surfaces of the lands closely fit the adjoining surface portions of the outer shell while the inner shell is in place therein, including the additional steps before forming a shell assembly of forming small grooves in all of the lands of the inner shell extending substantially around the entire inner shell, placing brazing material in all of said small grooves, thereafter inserting the inner shell in the outer shell, thereafter heating the inner and outer shells and the brazing material to cause the brazing material to assume a molten state and form a bond between the lands of the inner shell and the adjacent surface portions of the outer shell, and thereafter cooling the shells and the brazing material to allow the brazing material to harden and provide a substantially integral tip structure.

11. A process according to claim 10 in which brazing material in the form of wire is placed in the small grooves.

12. A process according to claim 3 in which the lands between the grooves in the outer shell have dimensions whereby the surfaces of the lands closely fit the adjoining surface portions of the inner shell while the inner shell is in place therein, including the additional steps before forming a shell assembly of forming small grooves in all of the lands of the outer shell extending substantially around the entire outer shell, placing brazing material in all of said small grooves, thereafter inserting the inner shell in the outer shell, thereafter heating the inner and outer shells and the brazing material to cause the brazing material to assume a molten state and form a bond between the lands of the outer shell and the adjacent surface portions of the inner shell, and thereafter cooling the shells and the brazing material to allow the brazing material to harden and provide a substantially integral electrode tip structure.

13. A process according to claim 12 in which brazing material in the form of wire is placed in the small grooves.

14. A process according to claim 1 in which each land resulting from forming grooves in one of the shells has a portion of the surface thereof adjacent the other shell spaced therefrom to form a narrow gap, and the brazing is additionally characterized as heating the inner and outer shells while the two shells are assembled together to a predetermined temperature, thereafter adding molten brazing material in sufficient quantity to fill up all of the grooves and all of the gaps between lands and the adjacent shell, thereafter inverting the shell assembly while maintaining the inner shell in place and allowing all of the molten brazing material to drain from the grooves, the molten brazing material being maintained in the gaps by capillary action, and allowing the shells and the molten brazing material to cool and harden and form a bond between the shells thereby forming a substantially integral tip structure.

15. A process according to claim 1 in which the lands formed in the shell between grooves have a surface contour adjoining the other shell such that a small gap exists between a portion of the land surface and the adjacent surface of the other shell, and the brazing is additionally characterized as securing braze material to the inner shell in a position whereby when the braze material melts it flows into all of the grooves and all of the gaps between the lands and the adjacent shell, heating the shells and the brazing material to a temperature less than the melting temperature of the material of which the shells are composed but to a temperature sufficient to cause the brazing material to become molten and run into all of said grooves and gaps, thereafter inverting the shell assembly while maintaining the inner shell in place, the molten brazing material running out of the grooves and forming clear passageways for the flow of cooling fluid, the molten brazing material being maintained in the narrow gaps between the lands and the adjacent shell by capillary action, thereafter allowing the assembly including the braze material in the narrow gaps to cool and the braze material to harden and form a substantially integral tip structure.

16. A process according to claim 1 in which the dimensions of the inner and outer shells are so chosen that the inner shell will fit in the outer shell with a small space existing between each land and the adjacent surface of the other shell, maintaining the inner shell within the outer shell in spaced relation, adding brazing material to the shell assembly in a position whereby when the brazing material melts it flows into all of the grooves and all of the spaces between the lands and the adjacent shell surface, heating the shells and the braze material while maintaining the spaced relation and allowing the molten braze material to run into all of said grooves and into all of said spaces between the lands and the adjacent shell, thereafter inverting the shell assembly and allowing molten braze material to run out of all said grooves and form clear passageways for the flow of cooling fluid, the braze material being retained in the narrow spaces between lands and the adjacent shell by capillary action, and allowing the shells and the braze material to cool and harden and form a bond between the two shells thereby producing an integral tip structure.

17. A process according to claim 1 in which solid braze material is added to the shell assembly and the shell assembly and the braze material thereafter heated together to reduce the braze material to a molten state, the molten braze material filling all of said grooves, thereafter inverting the shell assembly and allowing the molten braze material to run out of said grooves and form unobstructed fluid flow passageways around the tip, the braze material forming a bond between the lands formed by making said grooves and the adjacent shell.

18. A process according to claim 1 in which the brazing material is a copper-silver eutectic containing approximately 72% silver and 18% copper.

19. A process according to claim 1 in which the shells are composed of cuprous material.

20. A process according to claim 1 in which the shells are composed of silver.

21. A process according to claim 17 in which the outer shell is additional characterized as having inwardly slanting surfaces at the upper ends of the wall of smaller diameter and the wall of larger diameter to form troughs into which the molten brazing material flows, the molten brazing material thereafter flowing into the grooves and spaces.

22. A process according to claim 1 in which the first and second shells after being assembled one within the other are heated to a predetermined temperature less than the melting temperature of the material of which the shells are composed, the brazing material is separately heated to a temperature which causes the brazing material to assume a molten state, and the brazing material is thereafter added to the heated shell assembly, excess brazing material being thereafter removed to provide unobstructed passageways through all of said grooves, and the shell assembly and remaining brazing material being allowed to cool and harden and form an integral tip structure with the two shells bonded together.

23. A process according to claim 1 including the additional step of temporarily adding a weight to exert force on the inner shell to maintain the inner shell in position within the outer shell in close engagement therewith.

24. A process according to claim 1 in which the brazing is performed in a vacuum.

25. A process according to claim 1 in which the brazing is performed in a reduced atmosphere.

26. A process according to claim 1 in which the brazing includes the step of adding a brazing flux to the shell assembly.

27. A process according to claim 1 in which some of the grooves are formed in the inner shell and some of the grooves are formed in the outer shell.

References Cited

UNITED STATES PATENTS

| 2,402,646 | 6/1946 | Leathers | 219—120 |
| 2,446,932 | 8/1948 | Johnson | 219—120 |
| 2,581,997 | 1/1952 | Beggs | 29—25.13 |
| 3,299,309 | 1/1967 | Claypool | 29—25.14 |
| 3,368,020 | 2/1968 | De Corso et al. | 13—18 |
| 3,369,069 | 2/1968 | Kimeny et al. | 13—18 |

JOHN F. CAMPBELL, Primary Examiner

R. B. LAZARUS, Assistant Examiner

U.S. Cl. X.R.

29—25.13, 475, 483, 501, 502